No. 650,953. Patented June 5, 1900.
G. A. SCHOELLER.
CARBON CONTACT PIECE.
(Application filed Nov. 27, 1899.)

(No Model.)

UNITED STATES PATENT OFFICE.

GUSTAV A. SCHOELLER, OF MÜLHEIM-ON-THE-RUHR, GERMANY, ASSIGNOR TO FRIED. KRUPP, OF ESSEN, GERMANY.

CARBON CONTACT-PIECE.

SPECIFICATION forming part of Letters Patent No. 650,953, dated June 5, 1900.

Application filed November 27, 1899. Serial No. 738,432. (No model.)

*To all whom it may concern:*

Be it known that I, GUSTAV A. SCHOELLER, engineer, residing at Mülheim-on-the-Ruhr, German Empire, have invented certain new and useful Improvements in Carbon Contact-Pieces, of which the following is a specification.

My invention has reference to carbon contact-pieces—such, for instance, as are used for electric switches—and has for its objects, first, to render the connection between the carbon and its support as simple as possible; secondly, to enable the connection to be easily separated, and, thirdly, to insure perfect conductivity, so that the usual coating of the carbon with copper may generally be dispensed with.

For this purpose my invention consists, essentially, in securing a carbon having the form of a truncated cone upon its carrier by a correspondingly-recessed retaining-nut having a threaded connection with the carrier.

My invention will be best understood by reference to the annexed drawings, in which—

Figure 1:
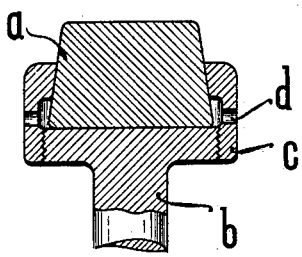
Figure 2:
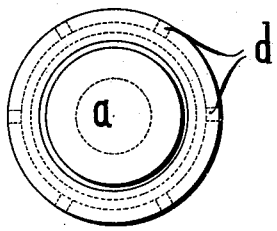

Figure 1 represents a vertical section of the carbon contact-piece. Fig. 2 is a plan view of the same.

Similar letters designate corresponding parts throughout both views of the drawings.

In the drawings the letter $a$ designates the carbon, which has the form of a truncated cone.

$b$ is the metallic carbon-support, and $c$ the metallic carbon-retaining nut, the upper part of which latter is shaped to fit the conical carbon. The nut $c$ is provided with a thread engaging a corresponding thread on the carbon-support $b$, and therefore by screwing the nut down the carbon is forced against its support $b$. The nut is provided with holes $d$, into which a suitable key is inserted for turning the same, or it may be made square or of other polygonal form for the same purpose.

The advantage of the above-described carbon contact-piece is that there is not only a direct transmission of the current to the carbon-support in consequence of the carbon's whole lower surface resting immediately upon and being pressed against the support by the retaining-nut, but that besides this the hollow conical surface of the retaining-nut, which presses against the corresponding surface of the carbon, is in metallic contact with the support, so that the current may also pass through the nut to the support. By the arrangement shown a very large surface of perfect contact between the carbon and its support is insured and the usual coating of the carbon with copper may be dispensed with.

What I claim as new is—

A carbon contact-piece consisting of a threaded conducting-support connected to the conducting-wire, a carbon having the form of a truncated cone and resting with its base upon the face of the conducting-support, and a conducting retaining-nut threaded to screw onto the support and internally tapered to fit the conical carbon; whereby the carbon is forced and held against the support and perfect contact is established between the conducting-support and the base of the carbon, as well as between the conical surface of the carbon and the retaining-nut, substantially as described.

In testimony whereof I have hereunto set my hand in the presence of two subscribing witnesses.

GUSTAV A. SCHOELLER.

Witnesses:
WM. ESSENWEIN,
EMIL HOETTE.